Aug. 23, 1932.  W. E. WENDT  1,873,169
ELECTRICAL APPARATUS
Filed June 30, 1930
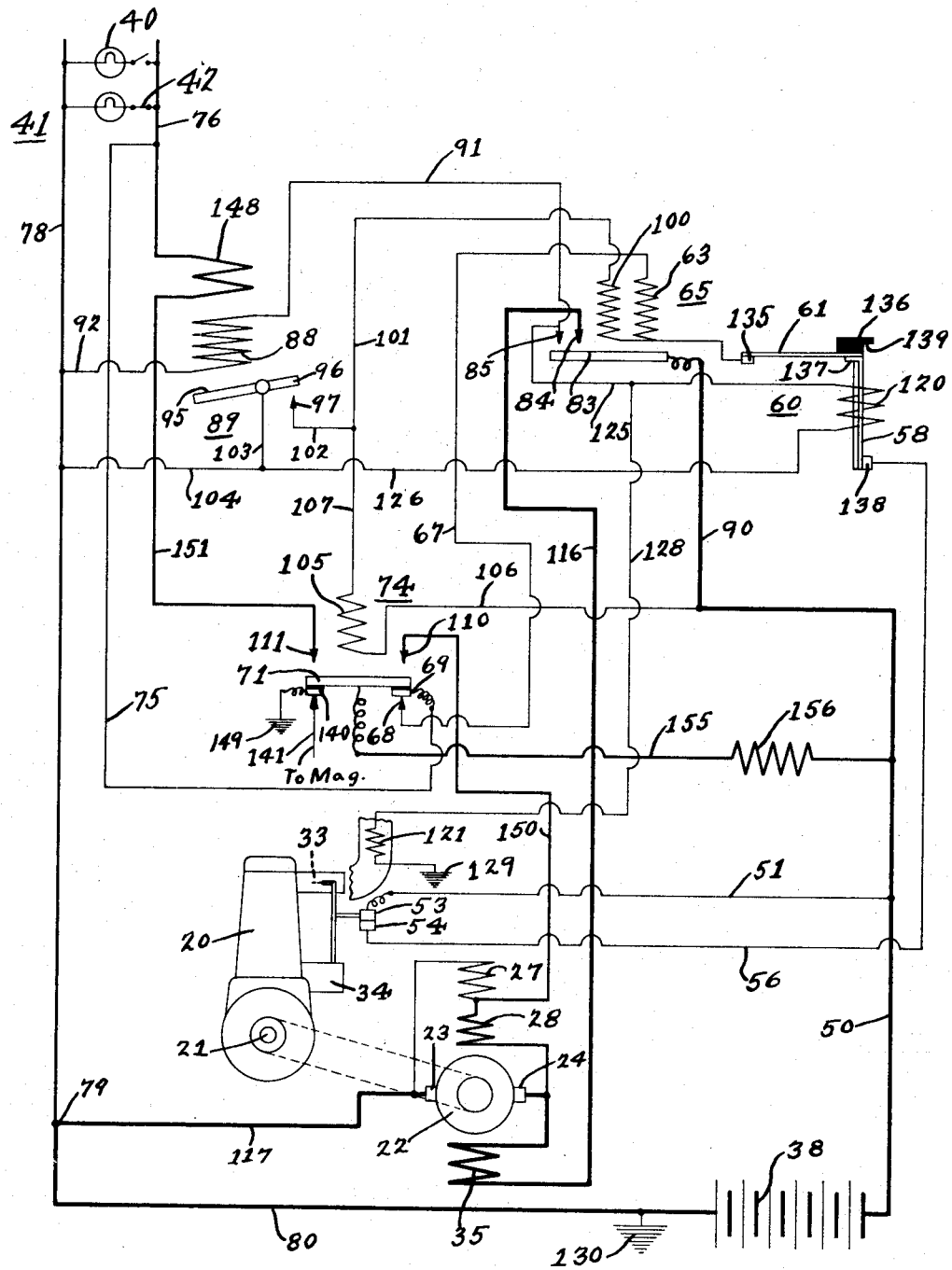
Wesley E. Wendt INVENTOR
BY
Spencer, Hardman & Jehn ATTORNEY Patented Aug. 23, 1932

1,873,169

UNITED STATES PATENT OFFICE

WESLEY E. WENDT, OF ROCHESTER, NEW YORK, ASSIGNOR TO DELCO-LIGHT COMPANY, OF ROCHESTER, NEW YORK, A CORPORATION OF DELAWARE

ELECTRICAL APPARATUS

Application filed June 30, 1930. Serial No. 464,934.

This invention relates to electrical generating systems.

One of the objects of the present invention is to provide an improved automatic electrical generating system of the type for supplying relatively high voltage current to service mains and in which a relatively low voltage battery is employed for rendering the system operative to supply such relatively high voltage current.

Further objects and advantages of the present invention will be apparent from the following description, reference being had to the accompanying drawing, wherein a preferred form of the present invention is clearly shown.

In the drawing:

The figure in the drawing is a wiring diagram illustrating the present invention.

Referring to the drawing, the numeral 20 designates in general a prime mover herein shown, for the purpose of illustration, as an internal combustion engine having a shaft 21 connected with an electrical apparatus 22 which operates, when driven by the prime mover, as a relatively high voltage generator having main brushes 23 and 24 connected with the armature thereof, and having a shunt field winding 27, and a series field winding 28 in series with the work circuit.

A throttle 33 for regulating the speed of the prime mover is adapted to be controlled by an engine speed responsive governor 34.

The electrical apparatus 22 includes a starting series field winding 35, and in addition to its generating functions, also functions as a relatively low voltage motor and is adapted to rotate the shaft 21 of the prime mover when acting as a starting motor, receiving current from a relatively low voltage storage battery 38. During the starting of the prime mover, the current through the series winding 35 and through the shunt winding 27 is cumulative to produce a sufficient starting torque for cranking the prime mover.

When the apparatus 22 functions as a generator the strength of the series field 28 will be increased or decreased in accordance with the load demand by the work circuit. As the field strength of the generator increases or decreases, the governor 34 will regulate the throttle 33 to control the speed of the prime mover, and consequently cause the prime mover to drive the generator at the proper speed to maintain a substantially constant voltage output. During generating operation the apparatus functions to supply current to a translating device such as light 40 in a work circuit 41 and to supply a charging current to the battery 38.

To start the prime mover automatically, one of the switches 42 is closed. The closing of one of the switches 42 causes current to flow through the following circuit: battery, wire 50, wire 51, contacts 53 and 54 which are adapted to be actuated by the engine speed responsive governor 34, wire 56, bimetallic thermostatic blade 58 of a cranking cutout 60, blade 61 of the cranking cutout 60, magnetic winding 63 of a starting relay and switch 65, wire 67, contact 68, contact 69 carried by an armature 71 of a main or line switch 74 but insulated therefrom, wire 75, service main 76, switch 42, light 40, service main 78 to connecting point 79 and wire 80 to the negative side of the battery.

The energization of magnet winding 63 of a starting relay and switch 65 will cause the upward movement of an armature 83 to thereby engage contacts 84 and 85. When the armature 83 engages contact 85, a circuit will be completed through a magnet winding 88 of a stop-relay 89 which is as follows: wire 50, wire 90, armature 83, contact 85, wire 91, magnet winding 88, wire 92, service main 78 and wire 80 to the negative side of the battery. When winding 88 is energized, it will cause the upward movement of armature 95 to engage a contact 96 with a contact 97. The closing of contacts 96 and 97 will complete a circuit through a magnet coil 100 of the starting relay and switch 65 which is traced as follows: wire 50, wire 51, contacts 53 and 54, wire 56, blades 58 and 61, magnet winding 100, wire 101, wire 102, contacts 97 and 96, wire 103, wire 104, service main 78 and wire 80 to the negative side of the battery. Winding 100 assists winding 63 and constitutes the holding coil for the armature 83. It will be noted that this winding 100 is connected directly across the battery and does not include a resistance such as the light 40 in the work circuit whereby the ampere turns created by the winding 100 is sufficient to firmly hold the armature in engagement with contacts 84 and 85, the armature and contact 84 constituting heavy contacts for the cranking circuit.

The closing of contacts 96 and 97 completes a circuit through a magnet winding 105 of the main switch 74 which is traced as follows: battery wire 50, wire 106, magnet winding 105, wire 107, wire 102, contacts 97 and 96, wires 103 and 104, service main 78 and wire 80 to the negative side of the battery. The energization of magnet 105 will cause the upward movement of the armature 71 of the line switch 74 to cause the separation of contacts 69 and 68 and to remove a ground from the magneto (not shown) to thereby condition the magneto for operation and by the separation of contacts 68 and 69 the circuit through the magnet winding 63 of starting relay and switch 65 will be interrupted, the armature 83 then being controlled entirely by the winding 100. The armature 71 on its upward movement will engage contacts 110 and 111 to thus complete the generating circuit between the electric apparatus 22 and the work circuit 41.

When the armature 83 engages contact 84 a cranking circuit is established between the motor generator and the battery which is traced as follows: wire 50, wire 90, armature 83, contact 84, wire 116, series winding 35, apparatus 22, wire 117 and wire 80 to the negative side of the battery.

The engagement of armature 83 with the contact 85 also completes a circuit through a heating coil 120 of cranking cutout 60, and a circuit through a preheater or heating coil 121 which is adapted to preheat the starting fuel mixture for the prime mover. The circuit through the heating coil 120 is as follows: battery 38, wire 50, wire 90, armature 83, contact 85, wire 125, heating coil 120, wire 126, wire 104, service main 78 and wire 80 to the negative side of the battery. The circuit through the preheater 121 is as follows: to contact 85 same as previously described, wire 125, wire 128, preheater 111, ground 129, the circuit being completed through ground 130 to the negative side of the battery.

Thus it will be noted that when the armature 83 of starting relay and switch 65 and the armature 95 of the relay 89 are actuated, the engine will be cranked and the ignition therefor is available since the magneto ground is broken by the upward movement of the armature 71.

If the prime mover should not start within a certain length of time abnormal discharge of the battery is prevented by the cranking cutout 60 which includes the blades 58 and 61, and heating coil 120. The blade 61 is fixed at 135 and has a non-conducting block 136 secured thereto. The blade 61 is urged downwardly by a spring (not shown) to engage a flanged end 137 of the bimetallic thermostatic blade 58, which blade is fixed at 138. The thermostatic blade 58 is in heat receiving relation to the heating coil 120. While the prime mover is cranking, current is passing through this heating coil as previously described. If the cranking of the prime mover should continue for an abnormal period, for example 1 to 2 minutes, the thermostatic blade 58 will be heated sufficiently to cause it to bow to the right, as viewed in the drawing, until the flanged end 137 moves to the right far enough to break its engagement with the blade 61 and is then retained in a shoulder 139 of the non-conducting block 136 by the downward movement of the blade 61. The separation of the blades 61 and 58 will interrupt the circuit through the coil 100. The deenergization of winding 100 will cause the armature 83 to descend by gravity to thus interrupt the cranking circuit by separating the armature 83 from contact 84 and also the armature 83 will be separated from contact 85 which interrupts the circuit through magnet winding 88 of switch 89. The deenergization of magnet winding 88 will cause the armature 95 to descend by gravity to separate the contact 96 from contact 97 which interrupts the circuit through the magnet winding 105 of line switch 74. The deenergization of magnet winding 105 will cause the armature 71 to descend by gravity whereby said armature will engage a contact 140 carried thereby but insulated therefrom with wire 141 leading to the magneto to thus connect the ground 149 to the magneto to ground the magneto.

During normal operation, when the prime mover attains a certain speed the governor 34 will actuate the contacts 53 and 54 to thus interrupt circuit through the magnet winding 100 to thus interrupt the cranking circuit as previously described and also interrupts the circuit through magnet winding 88, the preheater and the heating coil 120. When this occurs, the electrical apparatus 22 is supplying current to the work circuit 41 through a current coil 148 of stop-relay connected in series with the work circuit 41 which coil serves to maintain the contacts 96 and 97 of switch 89 closed as long as there is a demand for current by said work circuit. The circuit from the generator 22 through the work circuit 41 is as follows: wire 150, contact 110, armature 71, contact 111, wire 151, current coil 148, service main 76, switch 42, light 40, service main 78, and wire 117 to the negative side of the generator. The generator 22 also serves to supply a charging current of a proper value to the storage battery 38. The circuit through the storage battery is as follows: series field 28, wire 150, contact 110, armature 71, wire 155, resistance 156 which limits the amount of curent flowing through the battery 38, wire 50, battery 38, wire 80 and wire 117 to the negative side of the generator.

In the event it is desired to render the system inoperative all of the switches 42 must be opened. When the switches 42 are open, the circuit through the current coil 148 is interrupted. The deenergization of current coil 148 will cause the downward movement of the armature 95 of the stop-relay 89 to open contacts 96 and 97 which interrupts the circuit through the magnet winding 105 of the line switch 74. The deenergization of magnet winding 105 will cause the downward movement of armature 71 to ground the magneto as previously described to thus render the system inoperative.

While the form of embodiment of the present invention constitutes a preferred form, it is to be understood that other forms might be adopted, all coming within the scope of the claims which follow.

What is claimed is as follows:

1. An electrical generating system comprising in combination, a prime mover, service mains, a storage battery, electrical apparatus adapted to operate as a motor for rendering the prime mover operative and adapted to operate as a generator when driven by the prime mover, a starting relay and switch having a magnet winding in series with the battery and the service mains, a circuit between the battery and electrical apparatus closed by the winding of the starting relay and switch, a relay having a magnet winding in a circuit controlled by the starting relay and switch, a main switch having a magnet winding in a circuit controlled by the magnet winding of the relay and energized by the battery, said main switch being adapted to connect the electrical apparatus to said service mains and to interrupt the circuit through the magnet winding of said starting relay and switch, said starting relay and switch having a second magnet winding, said second winding being in a circuit controlled by said relay and being adapted to maintain the circuit closed between the battery and electrical apparatus, means responsive to the operation of the prime mover for interrupting the flow of current through said second winding of the starting relay and switch and through said magnet winding of the relay, and a current coil connected in series with the service mains maintaining the circuit for the magnet winding of the main switch closed as long as there is a demand for current by the service mains.

2. An electrical generating system comprising in combination a prime mover, service mains, a storage battery, electrical apparatus adapted to operate as a generator when driven by the prime mover, a starting relay and switch having a magnet winding energized by the battery, a relay having a magnet winding in a circuit controlled by the starting relay and switch and energized by the battery, a main switch having a magnet winding in a circuit controlled by the magnet winding of the relay and energized by the battery, said main switch being adapted to connect the electrical apparatus to said service mains, means for interrupting the flow of current through the magnet winding of the relay, and a coil energized by the electrical apparatus for maintaining the circuit for the magnet winding of the main switch closed as long as there is a demand for current by the service mains.

3. An electrical generating system comprising in combination a prime mover, service mains, a storage battery, electrical apparatus adapted to operate as a generator when driven by the prime mover, a starting relay and switch having a magnet winding energized by the battery, a relay having a magnet winding in a circuit controlled by the starting relay and switch and energized by the battery, a main switch having a magnet winding in a circuit controlled by the magnet winding of the relay and energized by the battery, said main switch being adapted to connect the electrical apparatus to said service mains, means for interrupting the flow of current through the magnet winding of the relay, said relay having a coil energized by the electrical apparatus for maintaining the circuit for the magnet winding of the main switch closed as long as there is a demand for current by the service mains.

4. An electrical generating system comprising in combination, a prime mover, service mains, a storage battery, electrical apparatus adapted to operate as a motor for rendering the prime mover operative and adapted to operate as a generator when driven by the prime mover, a starting relay and switch having a magnet winding in series with the battery and the service mains, a circuit between the battery and electrical apparatus closed by the winding of the starting relay and switch, a relay having a magnet winding in a circuit controlled by the starting relay and switch, a main switch having a magnet winding in a circuit controlled by the magnet winding of the relay and energized by the battery, said main switch being adapted to connect the electrical apparatus to said service mains and to interrupt the circuit through the magnet winding of starting relay and switch, said relay and switch having a second magnet winding, said second winding being in a circuit controlled by the relay and being adapted to maintain the circuit closed between the battery and the electrical apparatus, means for interrupting the flow of current through said second winding and through the magnet winding of the relay, and a coil energized by the electrical apparatus for maintaining the circuit for the magnet winding of the main circuit closed as long as there is a demand for current by the service mains.

In testimony whereof I hereto affix my signature.

WESLEY E. WENDT.